United States Patent
Wenger et al.

(10) Patent No.: US 7,605,719 B1
(45) Date of Patent: Oct. 20, 2009

(54) SYSTEM AND METHODS FOR DISPLAYING A PARTIAL IMAGES AND NON-OVERLAPPING, SHARED-SCREEN PARTIAL IMAGES ACQUIRED FROM VISION SYSTEMS

(75) Inventors: Jason Wenger, North Liberty, IA (US); Richard M Rademaker, Rijswijk (NL); Timothy Etherington, Cedar Rapids, IA (US); Alex Postnikov, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 294 days.

(21) Appl. No.: 11/881,113

(22) Filed: Jul. 25, 2007

(51) Int. Cl.
*G01C 21/00* (2006.01)

(52) U.S. Cl. .......................... 340/974; 340/980; 345/9; 701/14

(58) Field of Classification Search ......... 340/973–980; 701/3–14; 345/8, 9, 427; 382/154, 619
See application file for complete search history.

(56) References Cited

U.S. PATENT DOCUMENTS

| | | | |
|---|---|---|---|
| 5,296,854 A * | 3/1994 | Hamilton et al. ............. | 340/980 |
| 6,219,594 B1 * | 4/2001 | Nicosia et al. ............... | 701/16 |
| 7,098,913 B1 | 8/2006 | Etherington et al. | |
| 7,196,329 B1 | 3/2007 | Wood et al. | |
| 7,301,536 B2 * | 11/2007 | Ellenby et al. ............... | 345/419 |
| 7,312,725 B2 * | 12/2007 | Berson et al. ................ | 340/980 |
| 7,511,736 B2 * | 3/2009 | Benton ................... | 348/208.14 |
| 2001/0048763 A1 * | 12/2001 | Takatsuka et al. ........... | 382/154 |

* cited by examiner

*Primary Examiner*—Brent Swarthout
(74) *Attorney, Agent, or Firm*—Daniel M. Barbieri

(57) ABSTRACT

A novel and non-trivial system and methods for displaying partial images and non-overlapping images acquired by vision systems representing scene is disclosed. A system is disclosed for displaying partial images and shared, non-overlapping images on a display comprises a forward-looking imaging device system, an image system, a terrain rendering processor, and an indicating system. The terrain rendering processor determines, based on visibility data, which part of an image of one system will be displayed. A method is disclosed for displaying a partial image on a display unit. A terrain rendering processor determines acceptable and unacceptable visibility data based on contrast data of first image data, and based on such determination, presents image data corresponding to unacceptable data to the indicating system for presentation on a display unit. A second method is disclosed for displaying two images on a display unit of an aircraft. A terrain rendering processor determines acceptable and unacceptable visibility data based on contrast data of first image data, and based on such determination, presents image data corresponding to both acceptable and unacceptable data to the indicating system for presentation on a display unit.

20 Claims, 9 Drawing Sheets

SYSTEM AND METHODS FOR DISPLAYING A PARTIAL IMAGES AND NON-OVERLAPPING, SHARED-SCREEN PARTIAL IMAGES ACQUIRED FROM VISION SYSTEMS

BACKGROUND OF THE INVENTION

1. Field of the Invention

This invention pertains to the field of cockpit indicators or display units that provide terrain information to pilot or flight crew of an aircraft.

2. Description of the Related Art

Modern avionics systems employ Head-Up Display ("HUD") and Head-Down Display ("HDD") systems for providing tactical flight information to the pilot. In a HUD system, a HUD unit is mounted in front of the pilot at windshield level and is directly in the pilot's field of vision. The HUD system is advantageous because the display is transparent allowing the pilot to keep his or her eyes "outside of the cockpit" while the display unit provides tactical flight information to the pilot. In a HDD system, a tactical flight display is mounted in the cockpit instrument panel directly in front of the pilot and below windshield level. To view the presentation of information on a display unit of a HDD system, a pilot must look down into the cockpit, causing him or her to take his or her eyes from the outside scene in front of the aircraft.

Modern avionics systems employ Synthetic Vision Systems ("SVS") and Enhanced Vision Systems ("EVS") for displaying terrain information to both HUD and HDD systems. The SVS and EVS systems are advantageous because they present terrain information of the scene in front of the aircraft to the pilot. While this is advantageous to the pilot, there are times when the presentation of terrain information could obstruct the pilot's view of the actual scene in front of the aircraft. For instance, a pilot may be flying in meteorological conditions of low visibility in which his vision of the actual terrain is obscured. In SVS and EVS systems, terrain information is provided to the pilot through HUD and HDD systems. If the aircraft flies out of the meteorological condition, typical HUD and HDD systems continue to display the terrain information. In a HUD system, the display of terrain information could obstruct the pilot's view and not allow the pilot to view the actual terrain in front of the aircraft. HUD systems may allow the pilot to lower the opacity or disable the image or provide a feature which automatically lowers the level. However, these systems do not provide a feature which will partially display the terrain image in instances where there is only a partial break out of the meteorological condition. Such instances commonly occur when the aircraft is on final approach where the terrain may be partially—but not wholly—obscured by meteorological conditions. The embodiments disclosed herein provide for automatic display of partial terrain information on an aircraft display unit thereby removing an obstruction to the pilot's view of the scene outside the front of the aircraft.

In aircraft that employs a tactical flight display using SVS and EVS systems, terrain information enhanced by an EVS may be displayed or synthetic terrain information may be displayed by an the SVS but not both simultaneously. In instances where the content information provided by the EVS does not exist or only partially exists, the pilot must switch to the SVS to receive terrain information. The embodiments disclosed herein provide for the simultaneous display of partial synthetic terrain information from an SVS and of partial enhanced terrain information from an EVS without an overlap of displayed terrain information.

BRIEF SUMMARY OF THE INVENTION

The embodiments disclosed herein present novel and non-trivial system and methods for displaying partial images and non-overlapping images acquired by vision systems representing scene in front of the cameras or sensors that capture the scene in digital image form. Typically, each scene in its entirety may be acquired by one system and may be displayed as a whole image on a display unit, and the same display unit may be configured to accept whole images from more than one system. In the embodiments herein, whole images developed by one system may be broken into polygons, checked for contrast values and the content information contained therein, and if there is information contained in the polygons, inhibited from displaying of the portion of the image containing information. Likewise, if no information is present, then that part of the image which does not have content information will be displayed.

In one embodiment, a system is disclosed for displaying partial images and shared, non-overlapping images on a display unit. The system comprises a forward-looking imaging device system, an image system, a terrain rendering processor, and an indicating system. The terrain rendering processor determines, based on visibility data, which part of an image of one system will be displayed and which part of an image will not be displayed, thereby an image that do not obstruct the pilot's vision of the actual terrain in front of the aircraft. In another embodiment, the forward-looking imaging device system could be a visual spectrum camera system. In another embodiment, the forward-looking imaging device system could be an Enhanced Vision System ("EVS"). In another embodiment, an image system could comprise a Synthetic Vision System ("SVS"). In another embodiment, an image system could comprise an EVS. In another embodiment, the indicating system could consist of a Head-Up Display ("HUD") system. In another embodiment, the indicating system could consist of a tactical display unit system.

In another embodiment, a method is disclosed for displaying a partial image on a display unit. First image data could be collected from a forward-looking imaging device system and second image data from an image system. Both sets of data could be representative of the scene in which the images are captured. First image data and second image data could be provided to a terrain rendering processor for determination of acceptable and unacceptable visibility data based on contrast data fit to the screen of a display unit. Unacceptable data from the first image data may be matched with corresponding second image data creating a third image data representative of the unacceptable data. This third image data could be provided to the indicating system for presentation on a display unit but first image data may not, thereby providing a partial display on a display unit of the third image data.

In another embodiment, a second method is disclosed for displaying a partial image on a display unit. First image data could be collected from a forward-looking imaging device system and second image data from an image system. Both sets of data could be representative of the scene in which the images are captured. First image data and second image data could be provided to a terrain rendering processor for determination of acceptable and unacceptable visibility data based on contrast data fit to the screen of a display unit. Acceptable data from the first image data could be presented to the indicating system for display of a part of the scene. Unacceptable data from the first image data may be matched with corresponding second image data creating a third image data representative of the unacceptable data. This third image data could be provided to the indicating system for presentation on a display unit for the other part of the scene. Because the two sets of image data are exclusive, i.e., either acceptable or unacceptable, and both could be displayed, two non-overlapping, shared-screen images are presented on the display unit as that is one representative of the scene in front of the aircraft.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
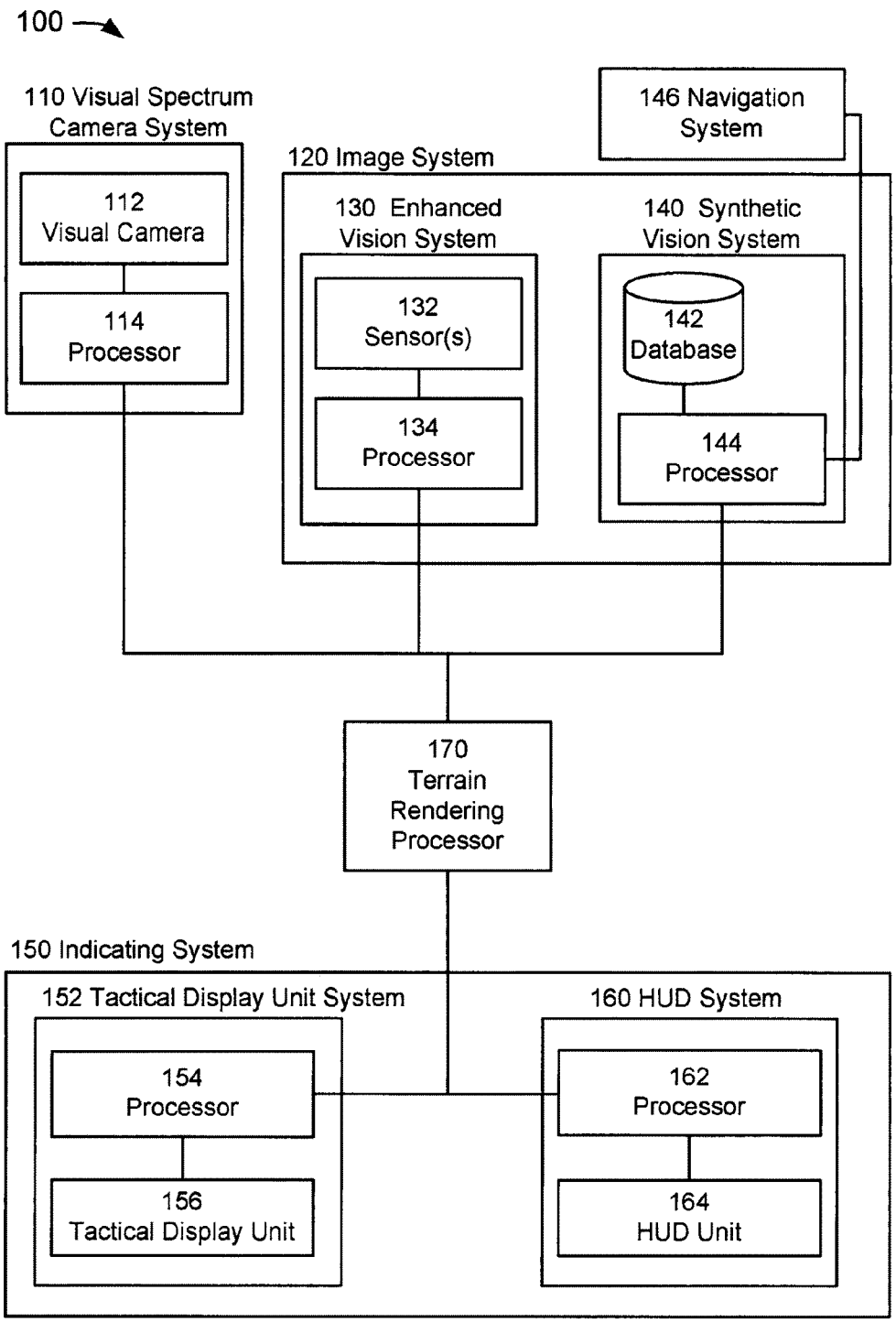
FIG. 1 depicts a block diagram of a system for displaying partial images and non-overlapping, shared-screen images acquired by vision systems.

FIG. 1 depicts an image control system 100 suitable for implementation of the techniques described herein. The system may be comprised of a visual spectrum camera system 110, an image system 120, an indicating system 150, and a terrain rendering processor 170.

The visual camera system 110 may be comprised of, in part, a visual camera 112 and a processor 114. The visual camera 112 is an example of a forward-looking image capture device. The visual camera 112 could be mounted in or near the cockpit and aimed directly in front of the aircraft to acquire visual image data of the scene in view by the pilot. The visual camera 112 could receive visual image data representative of the actual scene being viewed by the pilot. This visual image data may be provided as input to the processor 114.

The processor 114 (and each processor 134, 144, 170, 154, and 162) may be any electronic data processing unit which executes software or source code stored, permanently or temporarily, in a digital memory storage device or computer-readable media including, but not limited to, RAM, ROM, CD, DVD, hard disk drive, diskette, solid-state memory, PCMCIA or PC Card, secure digital cards, and compact flash cards. A common example of an electronic data processing unit is a microprocessor; however, for the embodiments herein, the term processor is not limited to the microprocessor and its meaning is not intended to be construed narrowly. For instance, a processor could also consist of more than one electronic data processing units. The processor 114 may be used, in part, to receive visual image data provided from the visual camera and prepare the visual image data for subsequent processing by a terrain rendering processor 170 as discussed herein.

The image system 120 is comprised of, in part, an enhanced vision system 130 and synthetic vision system 140. An enhanced vision system ("EVS") may provide a real-world image on display units of an aircraft's indicating system of the scene in front of an aircraft. At least one infrared camera may be mounted on the aircraft for detecting infrared radiation emanating from the scene in front of the aircraft. Alternatively, at least one sensor may be mounted on the aircraft to detect non-visible, near-infrared radiation such as that emitted from many runway and landing lights in the scene. An EVS may also employ a display-generating processor that may be operationally connected to the sensors to create a representation of the scene in front of the aircraft for display of display units of the aircraft's indicating system. An example of an EVS is disclosed in U.S. Pat. No. 7,196,329.

In an embodiment of FIG. 1, the EVS 130 is comprised of, in part, an infrared camera 132 and processor 134. The infrared camera 132 is another example of a forward-looking image capture device. The infrared camera 132 as discussed here is used singularly, but includes a plurality of cameras. Additionally, infrared camera 132 may mean one or more sensors for detecting non-visible, near-infrared radiation such as that emitted by many runway and landing lights. The infrared camera 132 could receive or acquire image data ("enhanced image data") representative of the actual scene in front of the aircraft that may be obscured from the pilot's view. This enhanced image data could be provided as input to the processor 134. The processor 134 could be used, in part, to prepare the enhanced image data received from the infrared camera 132 for subsequent processing by the terrain rendering processor 170 as discussed herein.

The synthetic vision system ("SVS") 140 is comprised, in part, of a terrain database 142 and a processor 144. An SVS could employ a terrain database to create a three-dimensional perspective of the scene in front of the aircraft on a two-dimensional display unit of an aircraft's indicating system. An SVS could employ topographical colors similar to those depicted on standard aeronautical charts. The three-dimensional perspective and topographical coloring presents an alternative view to the "blue/brown" electronic attitude indicator used in classic electronic primary flight displays ("PFD"), the perspective and coloring scheme that is known to those skilled in the art. An SVS allows the pilot to "see" the terrain ahead in 2D even though his visibility of the actual scene may be limited or obscured by meteorological conditions such as clouds and fog.

The processor 144 may be used to receive aircraft position data from the navigation system 146 as input. The navigation system 146 includes any system that provides navigation data. For example, a typical navigation system in an aircraft is comprised of numerous sub-systems known to those skilled in the art. Sub-systems which provide aircraft position data could include, but are not limited to, an inertial guidance system, a global navigation satellite system, and a flight management computing system. Based on the aircraft position data, the processor 144 may retrieve or acquire corresponding terrain image data from the terrain database 142 and prepare the terrain image data for subsequent processing by the terrain rendering processor 170 as discussed herein.

In the embodiment of FIG. 1, an indicating system 150 may receive image data from a terrain rendering processor 170. The indicating system 150 includes any system that provides flight and system information on an indicator or display unit including, but are not limited to, a tactical display unit system 152 and a Head-Up Display ("HUD") system 160.

The tactical display unit system 152 includes, in part, a processor 154 and a tactical display unit 156. The tactical display unit 156 presents tactical information to the pilot or flight crew—information relevant to the instant or immediate control of the aircraft, whether the aircraft is in flight or on the ground. The tactical display unit 156 is typically a Head-Down Display ("HDD") mounted to an aircraft's flight instrument panel located in front of a pilot and below the windshield and the pilot's field of vision. The tactical display unit 156 displays the same information found on a PFD such as basic "T-information" (i.e., airspeed, attitude, altitude, and heading). Although it provides the same information as that of a PFD, the tactical display unit 156 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit 156 is designed to provide flexible configurations which may be tailored to the desired configuration specified by a buyer or user of the aircraft. In an embodiment of FIG. 1, enhanced terrain data is provided to the tactical display unit system 152 by the enhanced vision system 130. In another embodiment, synthetic terrain information is presented on the tactical display unit 152 by the synthetic vision system 140.

The HUD system 160 includes, in part, a processor 162 and a HUD unit 164. The HUD unit 164 provides tactical information to the pilot or flight crew in the pilot's forward field of view through the windshield eliminating transitions between head-down to head-up flying. Similar to the tactical display unit 156, the HUD unit 164 may be tailored to the desired configuration specified by a buyer or user of the aircraft. In an embodiment of FIG. 1, enhanced terrain data may be provided to the HUD system 160 by the enhanced vision system 130. In another embodiment, synthetic terrain information may be provided to the HUD system 160 by the synthetic vision system 140.

A terrain rendering processor 170 could receive data input from the visual spectrum camera system 110, the EVS 130, and the SVS 140. It should be noted that, although the terrain rendering processor 170 is depicted in FIG. 1 as a stand-alone unit, any of the processors depicted herein or any processor used by other aircraft systems may perform the same processing functions of terrain rendering processor 170, either in whole or in part. The adaptability of processors for use in other functions or systems, and the ease of which such adaptation may occur, is well-known to those skilled in the art. Accordingly, the discussion of the terrain rendering processor 170 herein should not be read as a limitation or narrowly construed as to exclude the use of any processor used by other aircraft systems to accomplish the same or equivalent functions.

In an embodiment, the terrain rendering processor 170 could receive visual image data from the visual spectrum camera system 110. The terrain rendering processor 170 could divide the visual image data into a plurality of video image polygons and determine contrast values associated with the video image polygon and assign such values to a contrast values array. The terrain rendering processor 170 could also determine the position where each video image polygon would appear on the screen of the display unit; for example, the determination of position could include a scaling computation to convert "world space" (of the video image acquired by the visual camera 112) to "screen space." Then, the terrain rendering processor 170 could use the contrast values array to compute visibility data of each video image polygon as adapted to the screen space.

Once the visibility data has been established, the processor may determine the information content of the visibility data and classify it as being acceptable or unacceptable, either in whole or in part. The visibility data classified as acceptable corresponds with an existence of content information in the scene in front of the aircraft; for example, the pilot's vision is not obscured by meteorological conditions such as clouds or fog, allowing the pilot to see terrain or objects associated with the content information. The visibility data classified as unacceptable corresponds to the scene in front of the aircraft without the existence of information content, i.e., the pilot's vision is obscured by meteorological conditions.

The unacceptable visibility data may be used to select terrain image data, in whole or in part, for display. In an embodiment in which the aircraft is configured with an SVS 140, the terrain rendering processor 170 may receive terrain image data, identify that terrain image data which corresponds to the unacceptable visibility data, and provide the corresponding terrain image data to the indicating system 150. In an embodiment of which the aircraft is configured with a HUD system 160, terrain image data corresponding to unacceptable visibility data will be displayed on the HUD unit 164. Terrain image data corresponding to acceptable visibility data will not be displayed.

The unacceptable visibility data may also be used to select enhanced image data, in whole or in part, for display. In an embodiment in which the aircraft is configured with the EVS 130, the terrain rendering processor 170 may retrieve enhanced image data, identify that enhanced image data which corresponds to the unacceptable visibility data, and provide the corresponding enhanced image data to the indicating system 150. In an embodiment in which the aircraft is configured with a HUD system 160, only enhanced image data corresponding to unacceptable visibility data will be displayed on the HUD unit 164. Enhanced image data corresponding to acceptable visibility data will not be displayed.

In another embodiment of FIG. 1, the terrain rendering processor 170 could receive enhanced image data from the EVS 130. In a manner similar to that discussed for the visual spectrum camera system 110, the terrain rendering processor 170 could divide the enhanced image data into a plurality of enhanced image polygons and determine contrast values associated with the enhanced image polygon and assign such values to a contrast values array. The terrain rendering processor 170 could also determine the position where each enhanced image polygon would appear on the screen of the display unit in which such determination may include a scaling computation to convert "world space" (of the enhanced image acquired by the infrared camera 132) to "screen space." Then, the terrain rendering processor 170 could use the contrast values array to compute visibility data of each enhanced image polygon as adapted to the screen space. Once the visibility data is known, the terrain rendering processor 170 may determine the information content of the visibility data and classify it as being acceptable or unacceptable, either in whole or in part.

The acceptable visibility data may be provided to the indicating system 150. In an embodiment in which the aircraft is configured with a tactical display unit system 152, enhanced image data corresponding to acceptable visibility data will be displayed on the tactical display unit 164.

The unacceptable visibility data may be used to select terrain image data, in whole or in part, for display. In an embodiment in which the aircraft is configured with an SVS 140, the terrain rendering processor 170 may retrieve terrain image data, identify that terrain image data which corresponds to the unacceptable visibility data, and provide the corresponding terrain image data to the indicating system 150. In an embodiment in which the aircraft is configured with a tactical display unit system 152, terrain image data corresponding to unacceptable visibility data will be displayed on the tactical display unit 164. As such, the tactical display unit 164 may present image data corresponding to acceptable and unacceptable visibility data, data derived from both the EVS 130 and SVS 140.

Figure 2A:
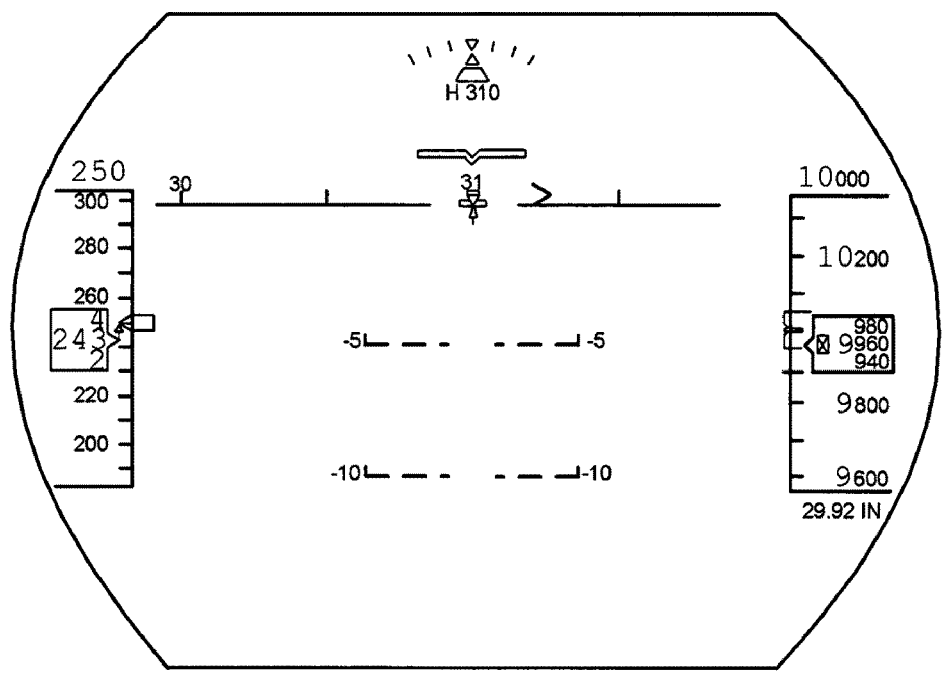
FIG. 2A depicts an exemplary illustration of a HUD unit.

The advantages and benefits of the embodiments discussed herein may be illustrated by showing examples of the information displayed on display units. FIG. 2A provides an exemplar depiction of a HUD unit 164 presenting tactical information to the pilot. It should be noted that the tactical information depicted thereon is minimal for the sake of presentation herein and not indicative of the plurality of indications or information with which it may be configured. It should also be noted that the tactical information presented on HUD unit 164 may also be provided to the pilot on a tactical display unit 156 in the same configuration. Because the indications or information shown on the HUD unit 164 of FIG. 2A are well-known to those skilled in the art, a discussion of the specific tactical information shown in FIG. 2A is not necessary. It should be further noted that, for the sake of presentation, the tactical information depicted on the HUD unit 164 as shown in FIG. 2A has been intentionally omitted from FIGS. 2B-2G and not indicative of the plurality of indications with which it may be configured; the omission of tactical information from the exemplar displays in FIGS. 2B-2G does not narrow the embodiments herein or create a limitation of them.

Figure 2B:
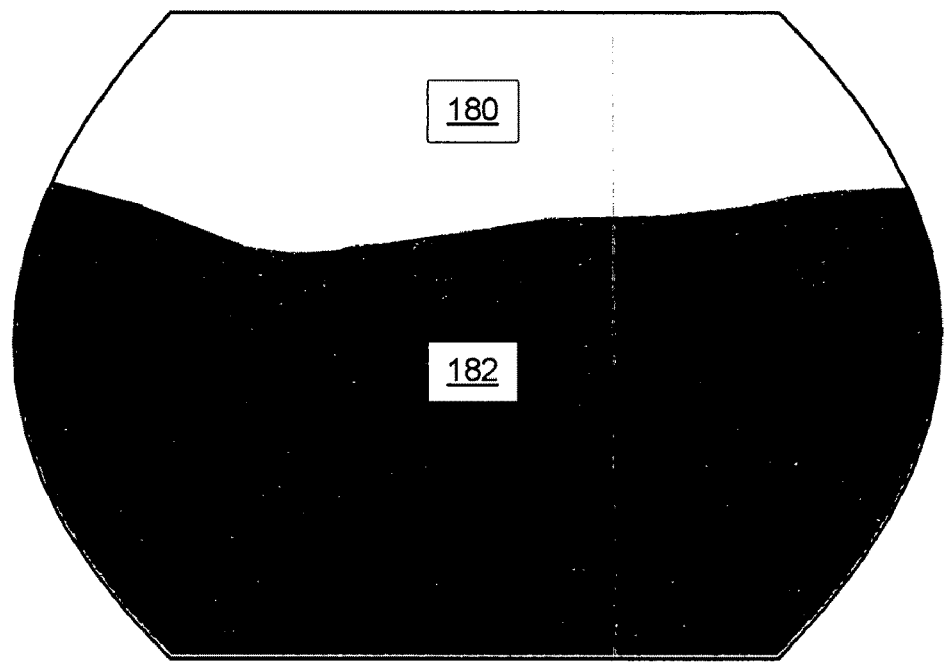
FIG. 2B depicts an exemplary illustration of a HUD unit and a view of the scene in front of the aircraft as seen by the pilot through the unit during flight.

FIG. 2B provides an exemplary depiction of the HUD unit 164 and a view of the scene in front of the aircraft as seen by the pilot through the unit during flight. In the illustration, the sky is seen in the approximate upper one-third of the HUD unit 164 and the terrain is seen in the approximate lower two-thirds. The sky has been labeled 180 and the terrain 182. As shown, there are no meteorological conditions (e.g., clouds, fog, smoke, volcanic ash, sand, haze, etc. . . . ) limiting the pilot's visibility; in other words, there is a clear sky with unlimited viability. The terrain rendering processor 170, after establishing visibility data, could determine that the changes in terrain establish the existence of content information in the scene in front of the aircraft. In addition, the terrain rendering processor 170 could classify the visibility data as being acceptable in whole. The pilot's vision is not obscured by meteorologically conditions, allowing the pilot to see terrain or objects associated with the content information. As such, neither enhanced images nor terrain images generated by the EVS 130 and SVS 140, respectively, are shown in FIG. 2B.

Figure 2C:
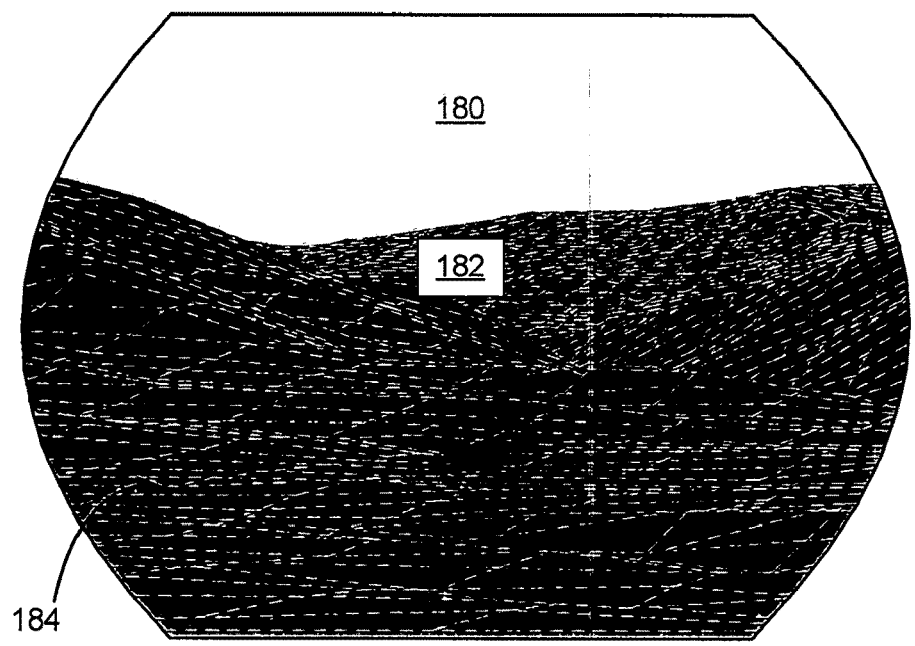
FIG. 2C depicts an exemplary illustration of a HUD unit displaying an enhanced image of terrain provided by an EVS.
Figure 2D:
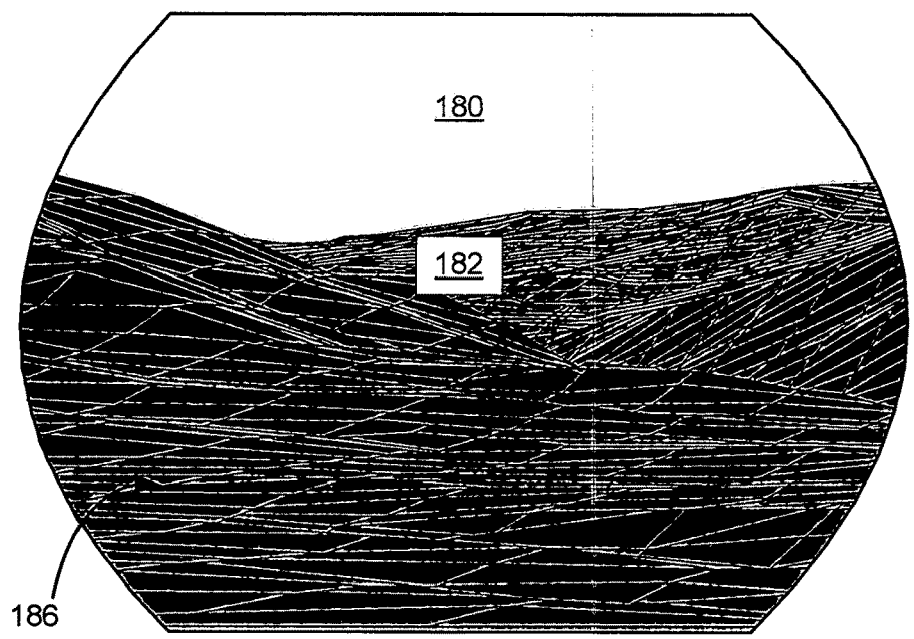
FIG. 2D provides an exemplary illustration of a HUD displaying an enhanced image of terrain provided by an synthetic terrain image.

FIGS. 2C and 2D provide exemplary depictions of a HUD unit 164 displaying an enhanced image of terrain provided by the EVS 130 and a terrain image of the SVS 140. FIGS. 2C and 2D are provided solely to illustrate how, without the advantages and benefits disclosed in the embodiments of this invention, these images may obstruct the view of the scene in front of the aircraft that is not obscured by meteorological conditions. For the purposes of illustration only, the EVS enhanced image of terrain 184 is shown as dashed lines in FIG. 2C, and the SVS terrain image 186 is shown as solid lines in FIG. 2D. Against the backdrop of the same view of the outside horizon as shown in FIG. 2B (i.e., no meteorological visibility limitations), the enhanced image of terrain 184 and the terrain image 186 SVS are seen as obstructing an otherwise unfettered view of the actual terrain in the scene in front of the aircraft.

Figure 2E:
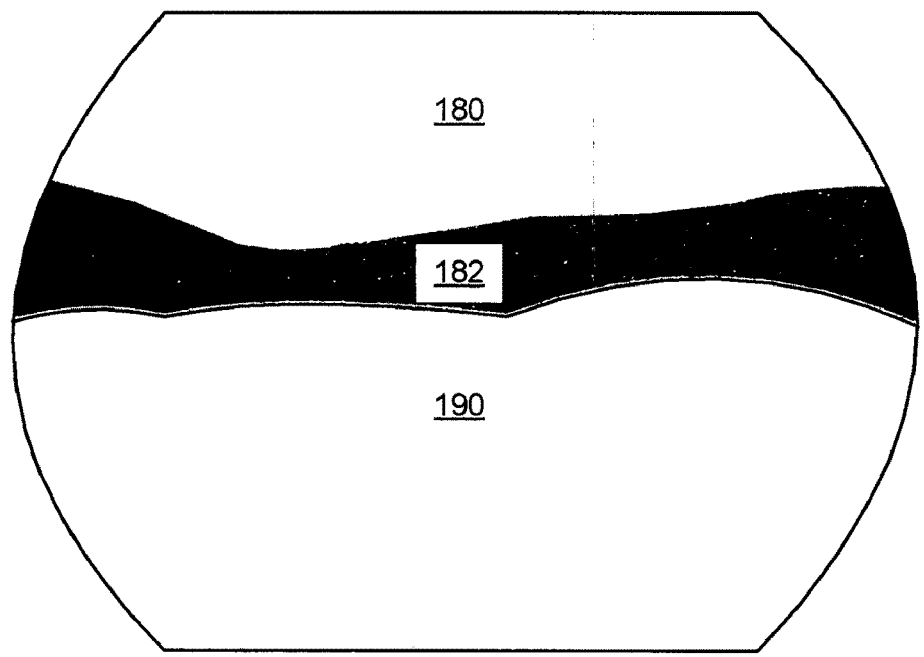
FIG. 2E provides an exemplary illustration of a HUD and a view of the scene in front of the aircraft as seen by the pilot through the HUD during flight where meteorological visibility limitations exist.

FIG. 2E provides an exemplary depiction of the HUD unit 164 and a view of the outside horizon as seen by the pilot through the unit during flight with meteorological visibility limitations. The sky 180 and terrain 182 are seen in the approximate upper half of the HUD unit 164 and clouds 188 in the approximate lower half. As compared with the meteorologically unobstructed views of the terrain FIGS. 2B-2D, the presence of meteorological conditions (here, clouds) in FIG. 2E blocks or obscures the pilot's view in the scene in front of the aircraft during flight; in other words, the terrain 182 is obscured. In order to overcome the obstruction presented by the clouds 188, an EVS enhanced image of terrain image 184 and SVS terrain image 186 of FIGS. 2C and 2D, respectively, could be displayed on the HUD display unit, in part, to provide the pilot with images of terrain where the terrain cannot be actually seen.

Figure 2F:
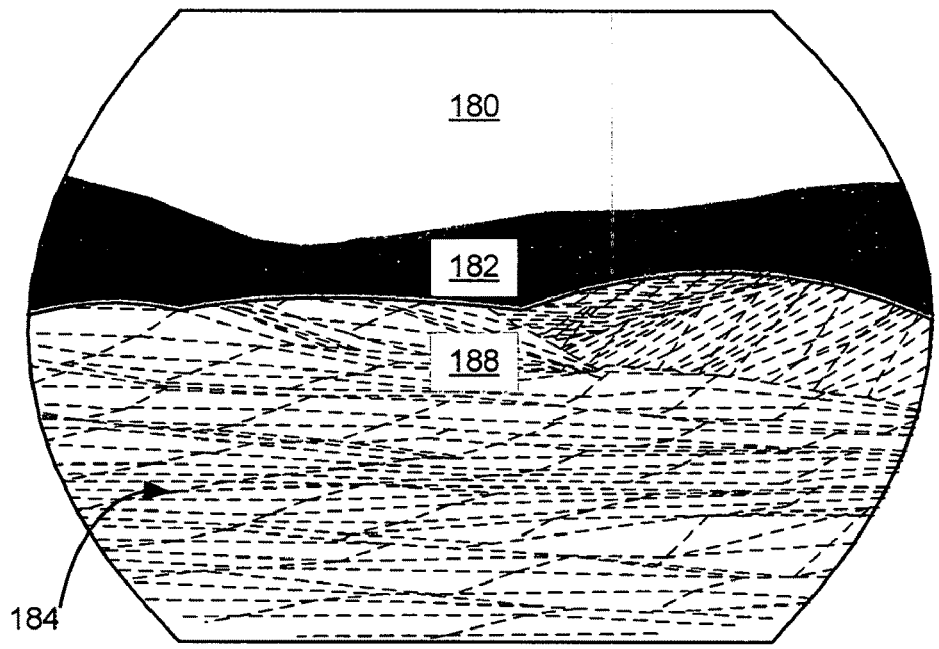
FIG. 2F provides an exemplary illustration of a HUD partially displaying an enhanced image of terrain provided an EVS where meteorological visibility limitations exist.
Figure 2G:
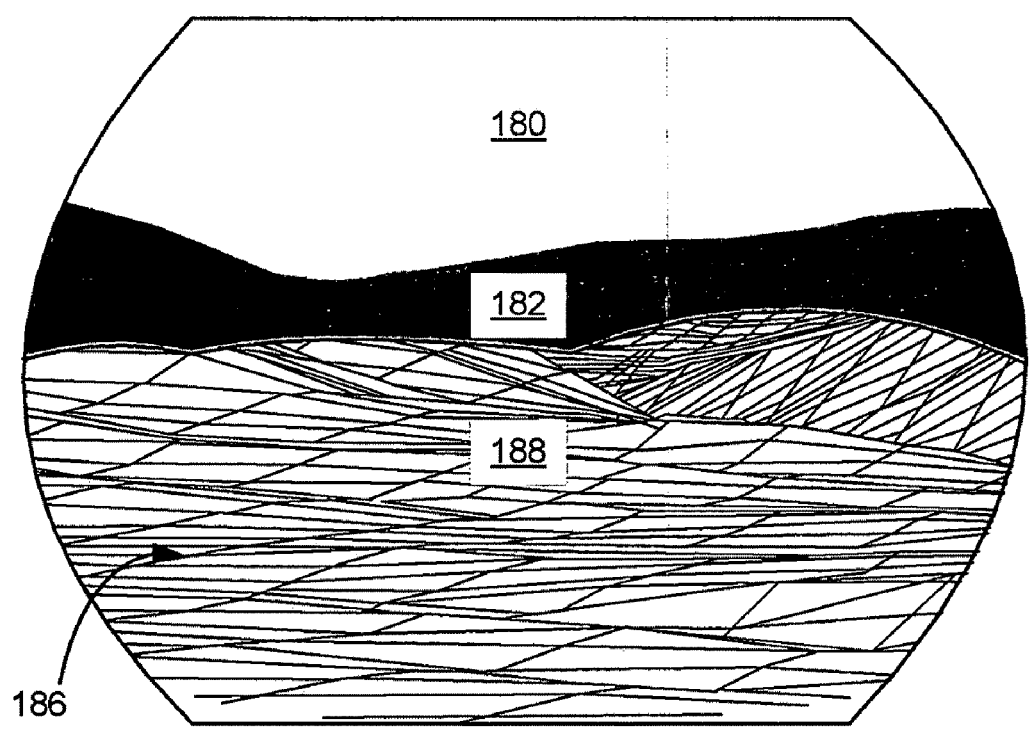
FIG. 2G provides an exemplary illustration of a HUD partially displaying a terrain image of an SVS where meteorological visibility limitations exist.

FIGS. 2F and 2G provide exemplary depictions of a HUD unit 164 which present on part of the display an enhanced image of terrain provided by the EVS 130 and a terrain image of the SVS 140, respectively. A comparison between FIGS. 2F and 2G and FIGS. 2C and 2D highlight some of the advantages and benefits of the embodiments of the invention disclosed herein.

The terrain rendering processor 170, after establishing visibility data, could determine that changes in terrain above the clouds 188 as viewed by the pilot establish the existence of content information in the scene in front of the aircraft and classify it as being acceptable. As such, the enhanced image of terrain 184 and the terrain image 186 generated by the EVS 130 and 140 SVS, respectively, may not be depicted in that portion of the HUD unit 164. Because they are not depicted, the enhanced image of terrain 184 and the terrain image 186 do not obstruct the actual terrain in the scene in front of the aircraft. As compared to FIGS. 2C and 2D, there is an absence the enhanced image of terrain 184 and terrain image 186 illustrated above the clouds 188 in FIGS. 2F and 2G, permitting the pilot of unobstructed view of the actual terrain above the clouds 188.

The terrain rendering processor 170, after establishing visibility data, could determine that the clouds 188 as viewed by the pilot establish the existence a lack of content information in the scene in front of the aircraft and classify it as being unacceptable. As such, the enhanced image of terrain 184 and the terrain image 186 generated by the EVS 130 and 140 SVS, respectively, may be depicted in that portion of the HUD unit 164. Accordingly, a pilot who is viewing the scene in front of the aircraft sees a partial enhanced image of terrain 184 and partial terrain image 186 displayed on HUD unit 164 where the clouds 188 limit the pilot's view as shown in FIGS. 2F and 2G. Because they are partially depicted, the enhanced image of terrain 184 and the terrain image 186 provide terrain information to the pilot where he cannot see the terrain without obstructing that actual terrain that he or she can see. The partial display of an image on the HUD unit 164 exemplifies some of the advantages of the embodiments discussed herein.

Figure 3A:
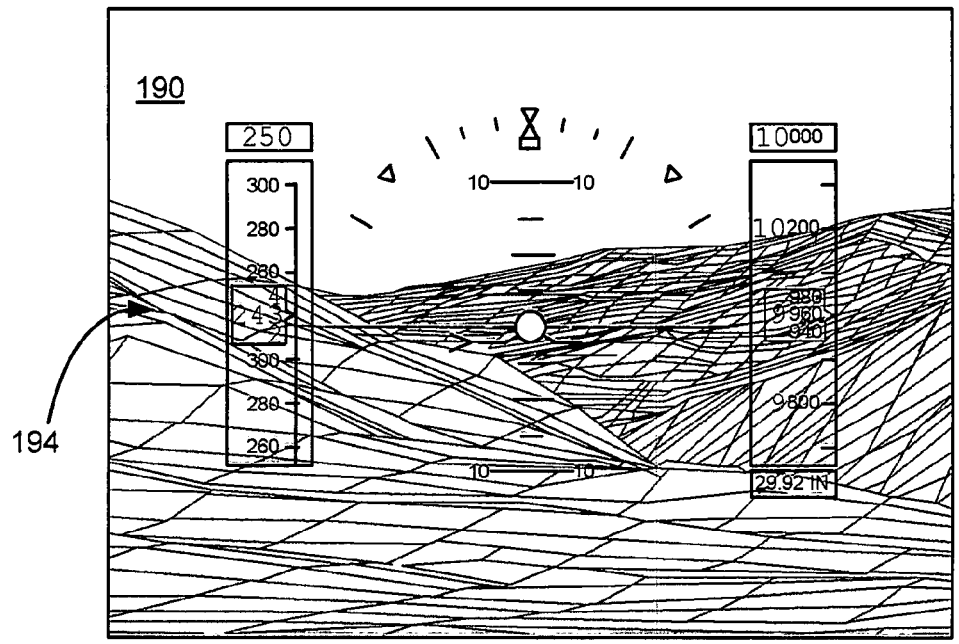
FIG. 3A provides an exemplary illustration on a tactical display unit displaying a sky image and a terrain image provided by an SVS.

The manner in which the terrain rendering processor 170 receives forward-looking data from the visual spectrum camera system 110 may be applied in flights where the 130 EVS receives forward-looking data. In another embodiment herein, FIG. 3A provides an exemplar depiction of a tactical display unit 156 presenting tactical information to the pilot. It should be noted that the tactical information depicted thereon is minimal for the sake of presentation and not indicative of the plurality of indications or information with which it may be configured. As discussed above, the tactical information presented on HUD unit 164 may also be provided to the pilot on a tactical display unit 156 in the same configuration. Because the indications or information shown on the tactical display unit 156 of FIG. 3A are well-known to those skilled in the art, a discussion of the specific tactical information shown in FIG. 3A is not necessary. It should be further noted that, for the sake of presentation, the tactical information depicted on the tactical unit 156 shown in FIG. 3A has been intentionally omitted from FIGS. 3B-3D and not indicative of the plurality of indications with which it may be configured; the omission of tactical information from the exemplar displays in FIGS. 3B-3D does not narrow the embodiments herein or create a limitation of them.

The exemplar of the tactical display unit 156 shown in FIG. 3A provides an illustrated depiction on the unit that displays a sky image 190 and a terrain image 194 (shown by solid lines) provided by the SVS 140. The exemplar of the tactical display unit 156 shown in FIG. 3B provides an exemplary depiction on the unit that displays a sky image 190 and an enhanced image of terrain 194 (shown by dashed lines) provided by the EVS 130.

Figure 3B:
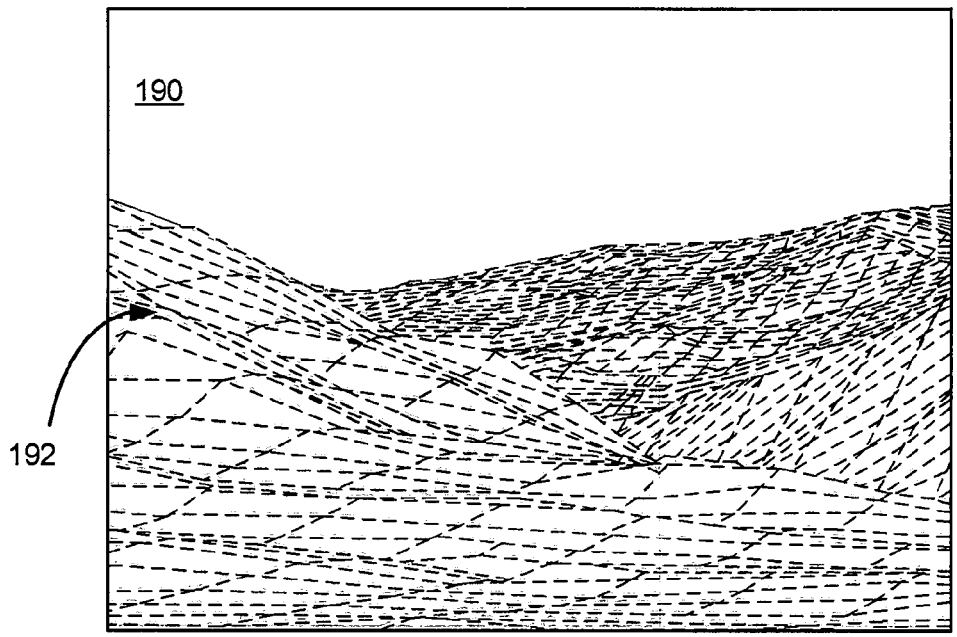
FIG. 3B provides an exemplary illustration on a tactical display unit displaying a sky image and an enhanced image of terrain provided by an EVS.

In an embodiment of FIG. 3B, the terrain rendering processor 170 could receive enhanced image data from the EVS 130. In a manner similar to that discussed for the visual spectrum camera system 110, the terrain rendering processor 170 could divide the enhanced image data into a plurality of enhanced image polygons and determine contrast values associated with the enhanced image polygon and assign such values to a contrast values array. The terrain rendering processor 170 could also determine the position where each enhanced image polygon would appear on the screen of the display unit in which such determination may include a scaling computation to convert "world space" (of the enhanced image acquired by the infrared camera 132) to "screen space." Then, the terrain rendering processor 170 could use the contrast values array to compute visibility data of each enhanced image polygon as adapted to the screen space. Once the visibility data is known, the processor may determine the information content of the visibility data and classify it as being acceptable or unacceptable, either in whole or in part.

Figure 3C:
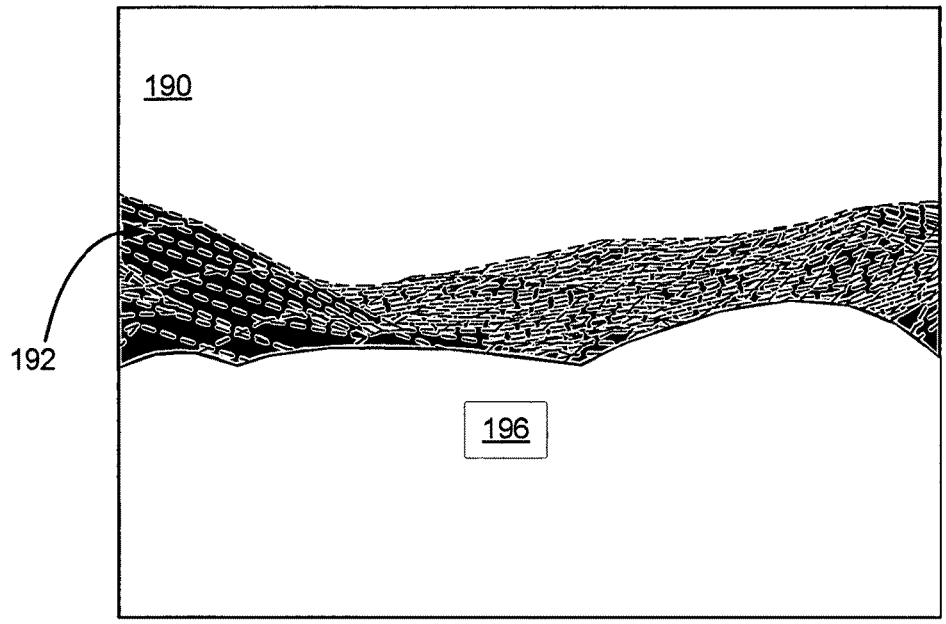
FIG. 3C provides an exemplary illustration on a tactical display unit partially displaying a sky image and an enhanced image of terrain provided by an EVS.
Figure 3D:
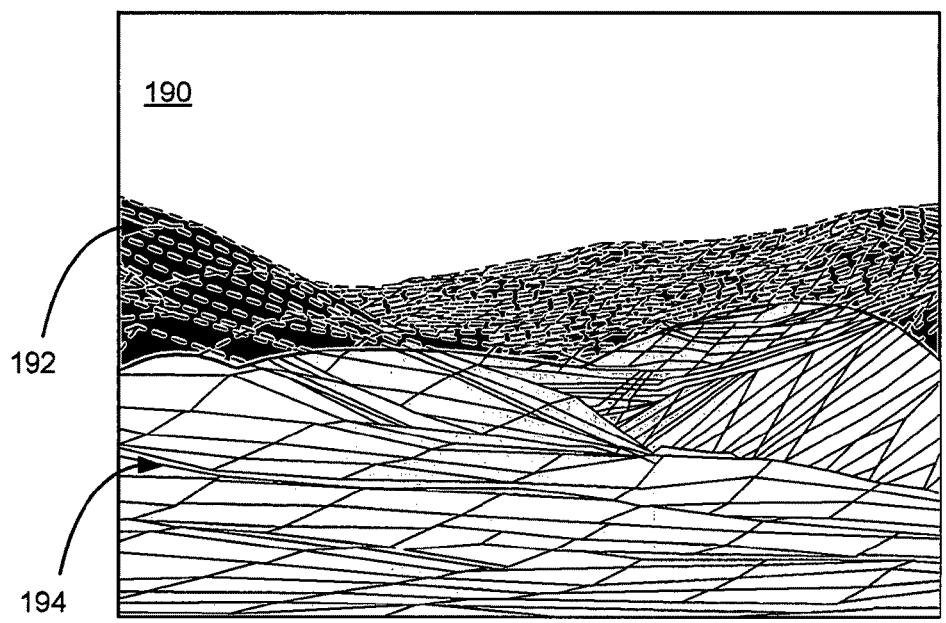
FIG. 3D provides an exemplary illustration on a tactical display unit displaying a sky image, an enhanced image of terrain provided by an EVS, and a synthetic terrain image provided by an SVS.

In an embodiment of FIG. 3C, the terrain rendering processor 170, after establishing visibility data, could determine that changes in content information exists in part of the scene in front of the aircraft and classify it as being acceptable in part. The terrain rendering processor 170 could determine that the lack of changes in content information in part of the scene in front of the aircraft represented by label 196 and classify it as being unacceptable in part. As such, the enhanced image of terrain 192 generated by the EVS 130 may not be depicted in that part of the tactical display unit. Instead, the terrain image 194 generated by the SVS 140 may be depicted where the terrain rendering processor 170 has classified the content information as being unacceptable. Accordingly, the depiction of terrain image 194 may be displayed simultaneously with the enhanced image of terrain 192 without an overlap of images as shown in FIG. 3D. The simultaneous, non-overlapping, partial display of two images on the tactical display unit 156 exemplifies some of the advantages of the embodiments discussed herein.

Figure 4:
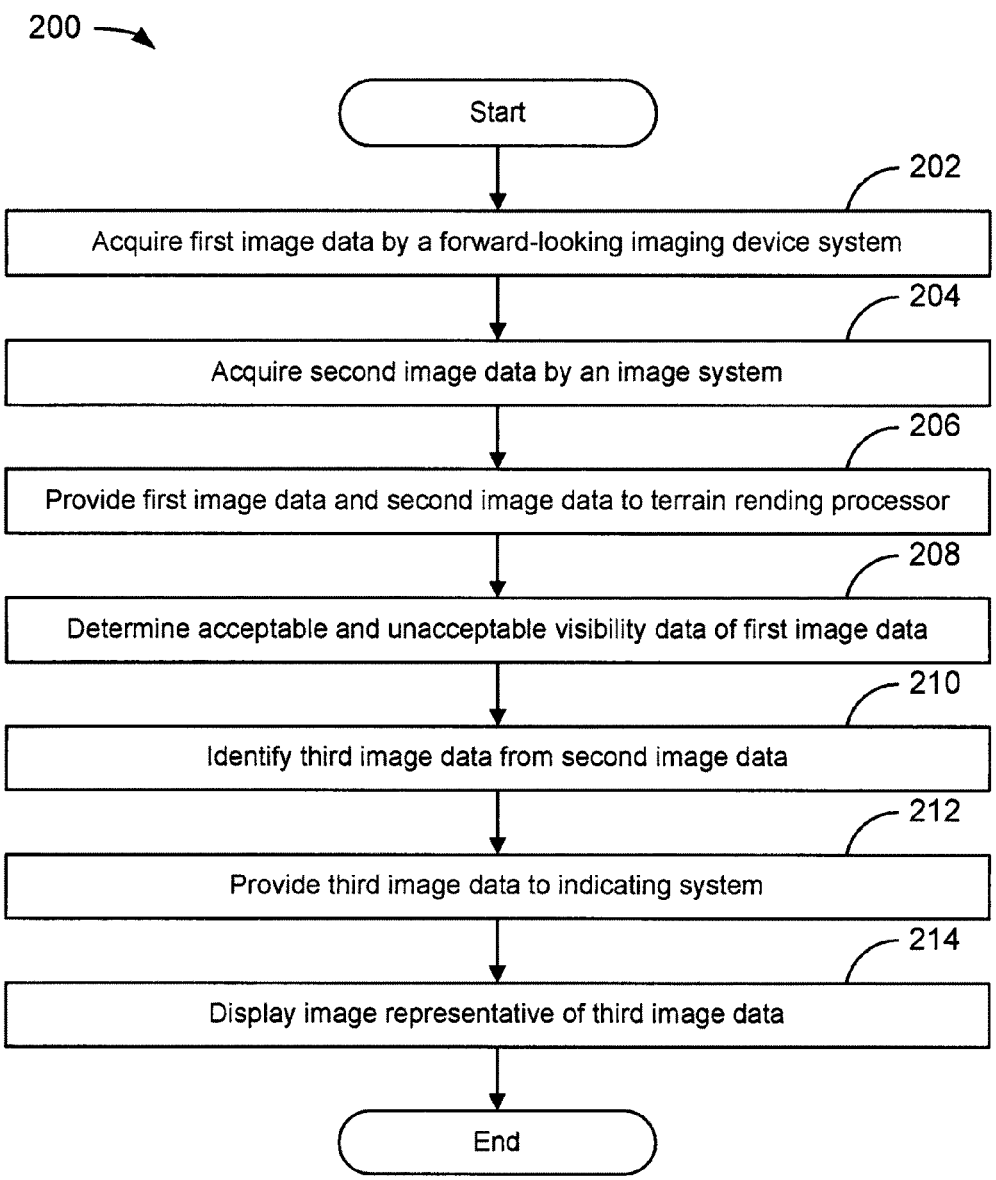
FIG. 4 provides a flowchart illustrating a method for controlling an image displayed on a display unit.

FIG. 4 depicts flowchart 200 of an example of a method for controlling image display within an aircraft. The flowchart begins with module 202 with the acquisition of first image data by a forward-looking imaging capture device system. In an embodiment, this may be accomplished by the visual spectrum camera system 110. The flowchart continues to module 204 with the acquisition of second image data by an image system. In an embodiment, the image system could be the SVS 130. In another embodiment, the image system could be the EVS 140. The flowchart continues to module 206 with the providing of the first image data and second image data to a terrain rendering processor 170. The flowchart continues to module 208 with the determination of acceptable and unacceptable visibility data of the first image data. In an embodiment, the terrain rendering processor 170 could divide of the first image data into a plurality of image polygons and contrast data for each image polygon. The terrain rendering processor 170 could determine the position of each image polygon on the screen of a display unit and make a determination of the acceptable and unacceptable visibility data from the content information contained the contrasted data.

The flowchart continues to module 210 with the identification of a third set of image data from the second image data. The identification of the third image data is based upon unacceptable visibility data. The flowchart continues to module 212 with the providing of the third set of image data to the indicating system of an aircraft. The flowchart continues to module 214 with the display of an image representative of the third set of image data. In an embodiment, the image may be representative of enhanced image data provided by an EVS 130 and displayed on the HUD unit 164 of the HUD system 160. In another embodiment, the image may be representative of synthetic image data provided by an SVS 140 and displayed on the HUD unit 164 of the HUD system 160. Then, the flowchart proceeds to the end.

Figure 5:
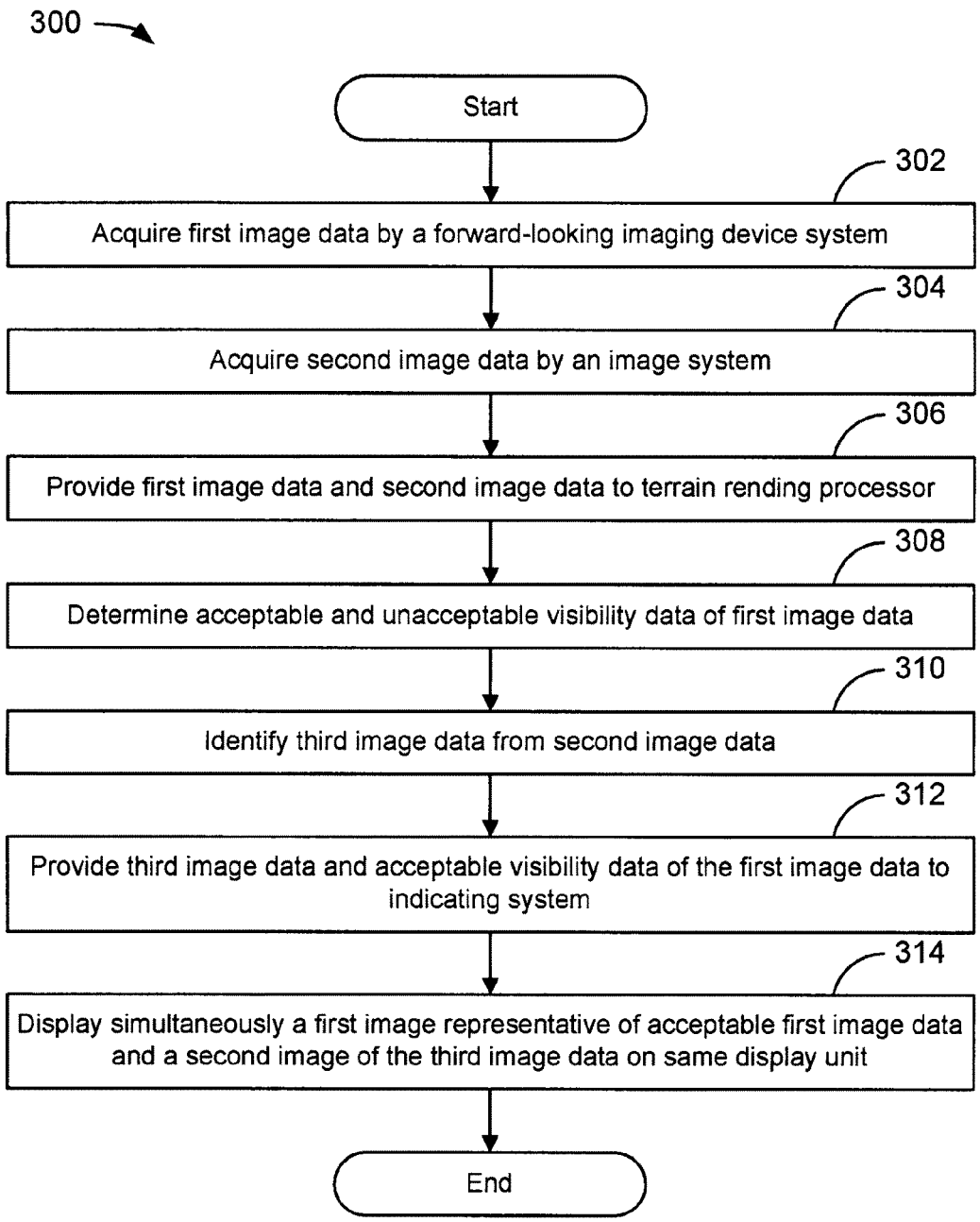
FIG. 5 provides a flowchart illustrating a method for simultaneously displaying two images on a display unit of an aircraft.

FIG. 5 depicts flowchart 300 of an example of a method for displaying two images on a display unit of an aircraft. The flowchart begins with module 302 with the acquisition of first image data by a forward-looking imaging capture device system. In an embodiment, this may be accomplished by the EVS 130. The flowchart continues to module 304 with the acquisition of second image data by an image system. In an embodiment, this may be accomplished by the SVS 140. The flowchart continues to module 306 with the providing of the first image data and second image data to a terrain rendering processor 170. The flowchart continues to module 308 with the determination of acceptable and unacceptable visibility data of the first image data. In an embodiment, the terrain rendering processor 170 could divide of the first image data into a plurality of image polygons and contrast data for each image polygon. The terrain rendering processor 170 could determine the position of each image polygon on the screen of a display unit and make a determination of the acceptable and unacceptable visibility data from the content information contained the contrasted data.

The flowchart continues to module 310 with the identification of a third set of image data from the second image data. The identification of the third image data is based upon unacceptable visibility data. The flowchart continues to module 312 with the providing of the third set of image data and the acceptable visibility data of the first image data to the indicating system of an aircraft. The flowchart continues to module 314 with the simultaneous display of a first image representative of the acceptable first image data and a second image data of the third set of image data on the same display unit. In an embodiment, the first image may be representative of enhanced image data provided by an EVS 130 and displayed on the tactical display unit 156 of the tactical display unit system 152. In another embodiment, the second image may be representative of synthetic image data provided by an SVS 140 and displayed on the tactical display unit 156 of the tactical display unit system 152. Then, the flowchart proceeds to the end It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for controlling an image displayed on a display unit of an aircraft, said system comprising:
    a forward-looking imaging device system for acquiring first image data;
    an image system for acquiring second image data;
    a terrain rendering processor; wherein such processor
        receives the first image data and the second image data,
        determines acceptable and unacceptable visibility data of the first image data,
        identifies third image data from the second image data corresponding to the unacceptable visibility data of the first image data, and
        provides an indicating system with data representative of the third image data; and
    the indicating system for displaying an image on a screen of a display unit representative of the third image data.

2. The system of claim 1, wherein the first image data and the second image data are representative of the scene in front of an aircraft.

3. The system of claim 1, wherein the forward-looking imaging device system for acquiring first image data comprises a visible spectrum camera system and the image system for acquiring second image data comprises synthetic vision system.

4. The system of claim 3, wherein the indicating system comprises a head-up display system.

5. The system of claim 1, wherein the forward-looking imaging device system for acquiring first image data comprises a visible spectrum camera system and the image system for acquiring second image data comprises enhanced vision system.

6. The system of claim 5, wherein the indicating system comprises a head-up display system.

7. The system of claim 1, wherein the processor further provides the indicating system data representative of acceptable visibility data of the first image data.

8. The system of claim 7, wherein the forward-looking imaging device system for acquiring first image data comprises an enhanced vision system and the image system for acquiring second image data comprises a synthetic vision system.

9. The system of claim 7, wherein the indicating system comprises a tactical display unit system.

10. The system of claim 1, wherein the processor may comprise of a plurality of processors.

11. A method for displaying a partial image on a display unit of an aircraft, said method comprising:
    acquiring first image data from a forward-looking imaging device system;
    acquiring second image data from an image system;
    providing the first image data and the second image data to a terrain rendering processor;
    determining acceptable and unacceptable visibility data of the first image data;
    identifying third image data from the second image data based upon the unacceptable visibility data of the first image data;
    providing an indicating system with data representative of the third image data; and
    displaying an image representative of the third image data on a display unit of the indicating system.

12. The method of claim 11, wherein the first image data and the second image data are representative of the scene in front of an aircraft.

13. The method of claim 11, wherein the first image data is acquired by a visible spectrum camera system and the second image data is acquired by a synthetic vision system.

14. The method of claim 13, wherein the indicating system comprises a head-up display system.

15. The method of claim 11, wherein the first image data is acquired by a visible spectrum camera system and the second image data is acquired by an enhanced vision system.

16. The method of claim 15, wherein the indicating system comprises a head-up display system.

17. A method for displaying a plurality of partial images on a display unit of an aircraft, said method comprising:
    acquiring first image data from a forward-looking imaging device system;
    acquiring second image data from an image system;
    providing the first image data and the second image data to a terrain rendering processor;
    determining acceptable and unacceptable visibility data of the first image data;
    identifying third image data from the second image data based upon the unacceptable visibility data of the first image data;
    providing an indicating system with data representative of the third image data and the acceptable visibility data of the first image data; and
    displaying simultaneously a first image representative of acceptable visibility data of the first image data and a second image of the third image data on the same display unit of the indicating system.

18. The method of claim 17, wherein the first image data and the second image data are representative of the scene in front of an aircraft.

19. The method of claim 17, wherein the first image data is acquired by an enhanced vision system and the second image data is acquired by a synthetic vision system.

20. The method of claim 19, wherein the indicating system comprises a tactical display unit system.

* * * * *